United States Patent [19]
Amos et al.

[11] Patent Number: 5,981,636
[45] Date of Patent: *Nov. 9, 1999

[54] MODIFYING AGENTS FOR POLYOLEFINS

[75] Inventors: Stephen E. Amos, Minneapolis, Minn.; Kent E. Nielsen, Dorchester, Canada; Chantelle McRoberts; Markus A. Wicki, both of London, Canada

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/773,707

[22] Filed: Dec. 27, 1996

[51] Int. Cl.⁶ ........................................................ C08J 5/15
[52] U.S. Cl. .................. 524/108; 524/109; 524/110; 524/111; 524/112; 524/241; 524/242; 524/247; 524/249; 524/285; 524/396; 524/397; 524/394
[58] Field of Search ................................... 524/112, 108, 524/109, 110, 111, 241, 242, 247, 249, 285, 396, 397, 394

[56] References Cited

U.S. PATENT DOCUMENTS

| | | | |
|---|---|---|---|
| 3,367,926 | 2/1968 | Voeks | 260/93.5 |
| 3,793,401 | 2/1974 | Nield et al. | 524/112 |
| 3,829,450 | 8/1974 | Schmerling | 524/112 |
| 3,954,913 | 5/1976 | Uebele et al. | 524/112 |
| 4,829,114 | 5/1989 | Trotoir et al. | 524/243 |
| 5,013,778 | 5/1991 | Bath | 524/173 |
| 5,135,975 | 8/1992 | Rekers | 524/108 |
| 5,342,868 | 8/1994 | Kimura et al. | 524/108 |

FOREIGN PATENT DOCUMENTS

| | | | |
|---|---|---|---|
| 0 267 695 | 5/1988 | European Pat. Off. | C08K 5/00 |
| 2 075 549 | 9/1971 | France | C08F 45/00 |
| 2 656 820 | 7/1991 | France | C08L 23/02 |
| 1 544 851 | 5/1970 | Germany | C08F 29/02 |
| 1 694 914 | 3/1972 | Germany | C08F 29/02 |
| 57-18682 | 1/1982 | Japan . | |
| 58-160343 | 9/1983 | Japan | C08L 67/20 |
| 61-17834 | 5/1986 | Japan . | |
| 1-180514 | 7/1989 | Japan | G02C 7/02 |
| 3-076815 | 4/1991 | Japan | D01F 8/06 |
| 5-139460 | 6/1993 | Japan | B65D 77/00 |
| 7-173342 | 7/1995 | Japan | C08L 23/10 |
| 2 290 296 | 12/1995 | United Kingdom . | |

OTHER PUBLICATIONS

Snider et al., "Mn(III)–Based Oxidative Free Radical Cyclization of Unsaturated Ketones," J. Org. Chem., 60, pp. 5376–5377, 1995.

Overman et al., "An Annual Publication of Satisfactory Methods for the Preparation of Organic Chemicals," Organic Syntheses, vol. 71, pp. 48–55, 1993.

Fillon et al., "Self–Nucleation and Recrystallization of Isotactic Polypropylene (α Phase) Investigated by Differential Scanning Calorimetry," Journal of Polymer Science: Part B: Polymer Physics, vol. 31, pp. 1383–1393, 1993.

Fillon et al., "Self–Nucleation and Enhanced Nucleation of Polymers. Definition of a Convenient Calorimetric "Efficiency Scale" and Evaluation of Nucleating Additives in Isotactic Polypropylene (α Phase)," Journal of Polymer Science: Part B: Polymer Physics, vol. 31, pp. 1395–1504, 1993.

H.N. Beck, "Heterogeneous Nucleating Agents for Polypropylene Crystallization," Journal of Applied Polymer Science, vol. 11, pp. 673–685 (1967).

Primary Examiner—Peter D. Mulcahy
Attorney, Agent, or Firm—Daniel C. Schulte

[57] ABSTRACT

Modifying agents for polyolefins enhance nucleation and crystallization of the polyolefins and provide improved optical and/or physical properties. The modifying agents are compounds of formulas (I) and (II):

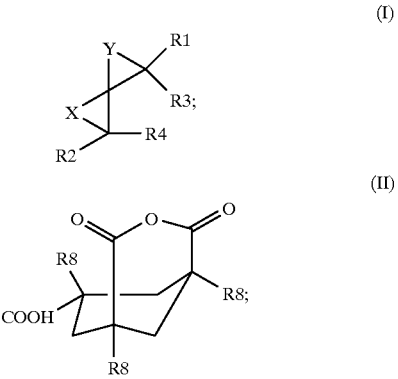

or a salt thereof, wherein X, Y, R1, R2, R3 and R4 and R8 are as defined in the specification.

36 Claims, No Drawings

MODIFYING AGENTS FOR POLYOLEFINS

FIELD OF THE INVENTION

The invention is directed to modifying agents that can improve properties of compositions made from polyolefins such as polypropylene. These modifying agents can improve the optical and physical properties of polymers and polymer blends to which they are added. The invention further relates to compositions that contain a polyolefin and a modifying agent as described herein, and to methods of improving the optical and physical properties of polyolefins using the modifying agents of the invention.

BACKGROUND OF THE INVENTION

Polyolefins, including polypropylene, are used in a variety of industrial applications. For some of these applications, such as packaging, storage containers, disposable medical devices, and so on, it is necessary or desirable that the product or article be optically clear. The optical and physical properties of the polyolefins are largely dependent upon the number of nucleation sites and the rate of nucleation during the crystallization process. The nucleation step of the overall crystallization process for polyolefins such as stabilized polypropylene is generally slow, so that a relatively small number of nucleation sites are formed. These nucleation sites are the points at which spherulites start to grow during the subsequent crystallization step. Because the number of sites is low, the spherulites can grow to a large size. When the size of the spherulites is larger than the wavelength of incident light, the light scatters and the polyolefin has a hazy appearance.

The size of the spherulites can be reduced and the optical properties of the polyolefin improved by the addition of nucleating and/or clarifying agents ("modifying agents") during processing. These agents increase the number of nucleation sites, and therefore the rate of nucleation. The size of the spherulites that form at these sites is smaller and the spherulites are more numerous as a result of this heterogeneous nucleation. If the spherulites are smaller in size than the wavelength of incident light, scattering of the light is substantially reduced and the resin appears clear.

Reduction of spherulite size also affects the physical properties of the polyolefin, e.g. flexural modulus, heat distortion temperature, impact strength and elongation at break of the resin can change with the addition of a modifying agent. The enhanced heterogeneous nucleation raises the crystallization onset temperature of the resin. This can result in a reduced cycle time during processing and greater manufacturing efficiency.

Nucleating and clarifying agents are generally known in the polymer art. U.S. Pat. No. 5,135,975 describes clarifying agents commercially known as the Millad™ group of products produced by Milliken Chemicals. These additives, particularly Millad™ 3988 have good organoleptic properties and resist plate-out, but dispersion problems resulting in the appearance of white specks have been encountered by some users. Relatively high process temperatures are needed to prevent the appearance of these white specks. Related clarifiers are described in JP 57-018682 and in JP 86-017834.

U.S. Pat. No. 5,342,868 describes the use of various organophosphorus salts as clarifiers for various crystalline synthetic resins. These additives perform well but their higher cost makes them somewhat less economical for use on a large scale.

There is a need in the art for agents that can be added to polyolefins such as polypropylene that are compatible with the polyolefin and stable under polyolefin processing conditions, that improve the optical and/or physical properties of the polyolefin, and that may be efficiently obtained or produced.

SUMMARY OF THE INVENTION

We have found that compounds of formulas (I) and (II), and salts thereof are useful modifying agents for polyolefins, especially as nucleating and/or clarifying agents:

(I)

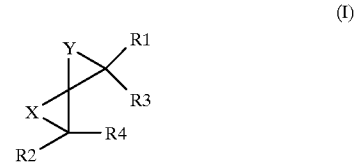

wherein X and Y are independently
  $C_{1-18}$ alkylene,
  $C_{2-18}$ alkenylene,
  $C_{3-18}$ cycloalkylene,
  $C_{4-18}$ cycloalkenylene, or
  arylene;
R1 and R2 are independently
  —H,
  $C_{1-18}$ alkyl, or
  —COR5;
R3 and R4 together form —A—B—C—, wherein
  A and C are independently

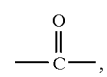

—O—,
  —CR6R7—, or
  —CR6—; and
  B is a single or double bond, or when neither A nor C is —O—, B can be —O—; R5 is —OH, —O—$C_{1-18}$ alkyl, —O—aryl, or —NRR';
each R6 and R7 is independently
  —H,
  halogen,
  $C_{1-18}$ alkyl,
  $C_{3-18}$ cycloalkyl,
  —COR5,
  —CRR'—COR5, or
  —NRR';
each R and R' is independently
  —H,
  $C_{1-18}$ alkyl,
  $C_{3-18}$ cycloalkyl, or
  $C_{1-18}$ alkyl substituted by one or more
  —OH, halogen, —COOH, COO$C_{1-18}$ alkyl, $C_{1-18}$ alkylene- S—$C_{1-18}$ alkyl, aryl, or
  substituted aryl groups;
or a salt thereof;

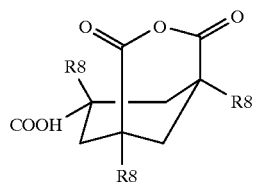

(II)

wherein each R8 is independently a —H or $C_{1-18}$ alkyl group or a salt thereof.

Accordingly, the invention provides compositions comprising a polyolefin and an effective nucleating and/or clarifying amount of a compound of formula (I) or (II), or a salt thereof.

The invention further provides a method of enhancing the crystallinity of a polyolefin by adding an effective amount of a compound of formula (I) or (II), or a salt thereof, to the polyolefin.

The compounds of formula (I) and (II) act as modifying agents, e.g. nucleating and/or clarifying agents, for polyolefins. A nucleating agent acts to improve the physical properties of the polyolefin such as strength, weatherability, solvent resistance, heat deflection temperature and so on by providing sites for crystal formation, resulting in formation of increased numbers of spherulites. If the spherulites are sufficiently large to scatter visible light, the polyolefin material will not be optically clear. A clarifying agent provides compositions that are more optically clear by causing the formation of spherulites that are sufficiently small that they scatter less ambient light. Generally, the different physical properties of the polyolefin such as the yield stress and impact resistance tend to vary as the spherulites become smaller in size, so that the desired optical clarity and physical properties should be balanced when determining the type and amount of modifying agent to use.

DETAILED DESCRIPTION OF THE INVENTION

The modifying agents of the invention are compounds of formula (I) or (II):

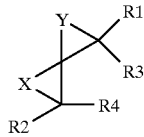

(I)

wherein X and Y are independently $C_{1-18}$ alkylene, $C_{2-18}$ alkenylene, $C_{3-18}$ cycloalkylene, $C_{4-18}$ cycloalkenylene, or arylene;

R1 and R2 are independently

—H, $C_{1-18}$ alkyl, or

—COR5;

R3 and R4 together form —A—B—C—, wherein

A and C are independently

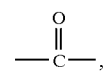

—O—,

—CR6R7—, or

—CR6—; and

B is a single or double bond, or when neither A nor C is —O—, B can be —O—; R5 is —OH, —O—$C_{1-18}$ alkyl, —O-aryl, or —NRR';

each R6 and R7 is independently

—H, halogen, $C_{1-18}$ alkyl, $C_{3-18}$ cycloalkyl,

—COR5,

—CRR'—COR5, or

—NRR';

each R and R' is independently

—H, $C_{1-18}$ alkyl, $C_{3-18}$ cycloalkyl, or $C_{1-18}$ alkyl substituted by one or more —OH, halogen, —COOH, $COOC_{1-18}$ alkyl, $C_{1-18}$ alkylene-S—$C_{1-18}$ alkyl, aryl, or substituted aryl groups, or a salt thereof;

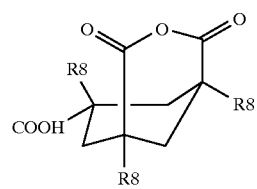

(II)

wherein each R8 is independently a —H or $C_{1-18}$ alkyl group or a salt thereof.

In the above formulas, each alkyl, alkenyl, alkylene and alkenylene group can be straight or branched. For example, "$C_{1-18}$ alkyl" includes methyl, ethyl, n-propyl, i-propyl, n-butyl, s-butyl, i-butyl, t-butyl, and so on. The cycloalkyl, cycloalkenyl, aryl, cycloalkylene, cycloalkenylene, and arylene groups include those groups that are alkyl substituted, up to the specified number of carbon atoms.

"Aryl" includes carbocyclic and heterocyclic aryl, but is preferably carbocyclic aryl, most preferably phenyl.

The anhydrides of formula (II) include those formed intramolecularly, that is between two of the —COOH groups on the cyclohexane ring.

Some compounds useful in the invention contain one or more chiral centers. In this instance the invention includes each enantiomer or diastereomer as well as mixtures (e.g. racemic mixtures) of the enantiomers or diastereomers.

Of the various possible salt forms of the compounds of formula (I) and (II), the $Na^+$, $Li^+$, $NH_4^+$ and $Zn^{2+}$ salts are generally preferred.

A preferred class of modifying agents includes the compounds of formula (I) wherein X and Y are both $C_{1-18}$ alkylene.

One particularly preferred modifying agent is camphanic acid and its salts. Camphanic acid has the following structure:

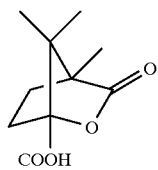

COOH

Ammonium camphanoate is a preferred salt form of camphanic acid.

Another preferred modifying agent is that of formula (III) below:

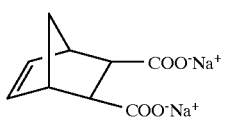

(III)

The modifying agent can be included in a composition of the present invention in an amount sufficient to provide desired optical and/or physical properties to the composition. Preferably the modifying agent can be present in an amount in the range from about 0.001 to 1 wt-% based on the total composition weight, more preferably from about 0.15 to 0.7 wt-%.

The modifying agents useful in the invention are known and commercially available, or can be readily synthesized by methods known in the chemical art. For example, camphanic acid is available from Aldrich Chemical Company, Inc., Milwaukee, Wis. or can be synthesized according to the procedure described in Org. Synth., 71, p. 48 (1992). Derivatives of camphanic acid can be prepared as desired. Other compounds can be prepared using the procedures described by Snider et al. in J. Org. Chem., 60, pp.5376–5377 (1995).

The modifying agents of the invention can improve physical properties of polyolefins such as polypropylene, as well as other polyolefin copolymers derived from monomers comprising at least one olefinic monomer. The polyolefins can generally have a melt flow rate in the range from about 1 to 70, preferably about 7 to 35 g/10 min according to ASTM D-1238.

Polyolefins useful in the composition of the invention include polymers and copolymers derived from one or more olefinic monomer of the general formula $CH_2=CHR''$, wherein $R''$ is hydrogen or $C_{1-18}$ alkyl. Examples of such olefinic monomers include propylene, ethylene, and 1-butene, with propylene being generally preferred. Representative examples of polyolefins derived from such olefinic monomers include polyethylene, polypropylene, polybutene-1, poly(3-methylbutene), poly(4-methylpentene) and copolymers of ethylene with propylene, 1-butene, 1-hexene, 1-octene, decene-1,4-methyl-1-pentene and 1-octadecene.

The polyolefin may optionally comprise a copolymer derived from an olefinic monomer and one or more further comonomers that are copolymerizable with the olefinic monomer. These comonomers can be present in the polyolefin in an amount in the range from about 1 to 10 wt-% based on the total weight of polyolefin. Useful such comonomers include, for example, vinyl ester monomers such as vinyl acetate, vinyl propionate, vinyl butyrate, vinyl chloroacetate, vinyl chloropropionate; acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid such as dimethyl maleate, and diethyl maleate; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers, and N-vinyl pyrrolidine monomers.

The polyolefin may also contain a metallic salt form of a polyolefin, or a blend thereof which contains free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt.

Preferred polyolefins include polypropylene homopolymers and copolymers of propylene with ethylene, 1-butene, 1-hexene, 1-octene, 4-methyl-1-pentene, vinyl acetate, or methyl acrylate.

The polyolefin can also include blends of these polyolefins with other polyolefins or copolymers or blends thereof containing conventional adjuvants such as antioxidants, light stabilizers, acid neutralizers, fillers, antiblocking agents and pigments.

Representative blends of polyolefins useful in this invention include blends of polyethylene and polypropylene, low density polyethylene and high-density polyethylene, and polyethylene and olefin copolymers derived from an olefinic mononer and one or more of the above-described optional copolymerizable comonomers, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The modifying agent may be incorporated into a polyolefin using any method that does not cause substantial degradation or vaporization of the modifying agent. This can be accomplished using any mixing method that is convenient, such as a melt mixer, an extruder, and the like. The modifying agent may be dry blended with the polyolefin in flake, granule, or pellet form; a liquid melt, dispersion, suspension or solution of the modifying agent may be combined with the polyolefin in flake, granule, or pellet form; or a concentrated blend of the modifying agent in polyolefin may first be prepared and then blended with the polyolefin to obtain a final desired concentration of modifying agent in polyolefin. If such a concentrated blend is prepared the modifying agent can be present in the concentrated blend in an amount in the range from about 0.5 to 5 wt-%.

If desired, components may be added to the polyolefin in addition to the modifying agent. Examples of such components include pigments, antioxidants, acid neutralizers, antistatic agents, ultraviolet light absorbers, and hindered amine stabilizers.

The modifying agent can be added to the polyolefin at any time during processing of the polyolefin, so long as adequate dispersion of the modifying agent is obtained before the polyolefin begins to crystallize.

The polyolefin containing a desired amount of modifying agent can be formed into articles as desired in any manner known in the art. For example the polymer can be injection molded, extruded, thermoformed, compression molded, pressed and so on to form desired shapes and articles.

The invention is further described by reference to the following examples, which are understood to be illustrative and not limiting of the invention. Reported yields of greater than 100% of theoretical yield are believed to be caused by incomplete removal of solvent and/or absorption of water.

EXAMPLES
Preparation of Additives

Preparative Example 1—Dilithium bicyclo[2.2.1]
hept-5-en-2,3-dicarboxylate

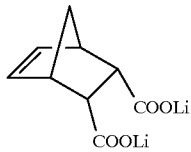

To a suspension of norborn-5-en-2,3-dicarboxylic acid (5.02 g, 27.6 mmol) in $H_2O$ (170 mL) was added $LiOH \cdot H_2O$ (2.57 g, 61.3 mmol) at room temperature. MeOH was added with stirring until a homogeneous solution was obtained. The solvent was removed in vacuo and the resulting colorless, crystalline product was dried.

Preparative Example 2—2-Methyl-3-sodium
bicyclo[2.2.1]hept-5-en-2,3-dicarboxylate

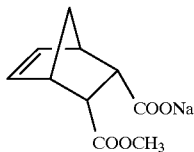

To a solution of norborn-5-en-2,3-dicarboxylic anhydride (5.05 g, 30.8 mmol) in MeOH (50 mL) was added pyridine (50 μL) and the reaction mixture was heated to reflux temperature for 2 hours, with stirring. The solvent was removed in vacuo. The resulting solid residue was dissolved in EtOAc and extracted three times with 10% $NaHCO_3$. The aqueous layer was acidified with conc. HCl until the pH was 1 and extracted three times with EtOAc. The combined organic phases were washed with brine and dried over $Na_2SO_4$. Evaporation of the solvent gave a solid (5.87 g) which was recrystallized from EtOAc/hexane (1:1) to yield the product as colorless crystals: 3.37 g (56%), mp=102–103° C.

To a solution of the above product (1.00 g, 5.1 mmol) in $MeOH/H_2O$ (1:1) (20 mL) was added 1N NaOH (5.1 mL, 5.1 mmol) and the reaction mixture was stirred at room temperature for 15 min. The solvent was removed in vacuo, and the resulting colorless powder was dried. Yield: 1.00 g (90%), mp=244° C.

Preparative Example 3—Octadecyl bicyclo[2.2.1]
hept-5-en-3-carboxy-2-carboxamide

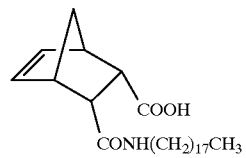

To a suspension of octadecylamine (3.30 g, 12.2 mmol) in $CH_2Cl_2$ (100 mL) was added a solution of norborn-5-en-2,3-dicarboxylic anhydride (2.01 g, 12.2 mmol) in $CH_2Cl_2$ (100 mL). The suspension was stirred at room temperature for 50 hrs. under a $N_2$-atmosphere. The solvent was removed in vacuo and the resulting colorless solid was dried. Yield: 5.25 g (99%), mp=115° C.

Preparative Example 4—Dilithium bicyclo[2.2.2]
oct-5-en-2,3-dicarboxylate

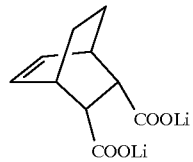

To a solution of bicyclo[2.2.2]oct-5-en-2,3-dicarboxylic acid (1.02 g, 5.2 mmol) in EtOH (25 mL) was added a solution of $LiOH \cdot H_2O$ (437 mg, 10.4 mmol) in $H_2O$ (25 mL). The solution was stirred at room temperature for 1 hr. The solvent was removed and the resulting colorless solid was dried.

Preparative Example 5—2-Methyl-3-sodium
bicyclo[2.2.2]oct-5-en-2,3-dicarboxylate

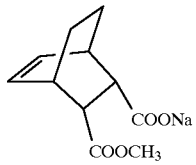

To a solution of bicyclo[2.2.2]oct-5-en-2,3-dicarboxylic anhydride (1.51 g, 8.5 mmol) in McOH (15 mL) was added pyridine (15 μL) and the solution was heated to reflux temperature for 2 hrs. The solvent was evaporated. The resulting beige syrup was dissolved in EtOAc, washed with 5% HCl, and extracted with 10% $NaHCO_3$ (3×25 mL). The aqueous phase was acidified with conc. HCl until pH=1 and extracted with EtOAc (3×30 mL). The combined organic phase was washed with brine and dried ($Na_2SO_4$). Removal of the solvent gave a colorless solid (1.36 g) which was recrystallized from EtOAc/hexane to yield the product as colorless crystals. Yield: 1.05 g (59%).

To a solution of the above product (746 mg, 3.6 mmol) in $MeOH/H_2O$ (2:1) (30 mL) was added 1N NaOH (3.6 mL, 3.6 mmol) and the resulting solution was stirred at room temperature for 30 min. The solvent was removed in vacuo and the remaining colorless solid was dried.

Preparative Example 6—trans-bicyclo [2.2.1]hept-5-en-2,3-dicarboxylic acid

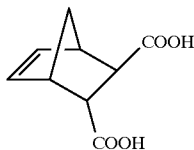

To a solution of trans-norborn-5-en-2,3-dicarboxylic acid monoethyl ester, prepared from cyclopentadiene and fumaric acid monoethyl ester, (10.6 g, 50.3) mmol) in EtOH (35 mL) was added a solution of NaOH (6.2 g, 155 mmol) in H$_2$O (30 mL) at room temperature. The reaction mixture was stirred for 2.5 hrs. at room temperature and conc. HCl was added until pH=1. The ethanol was removed in vacuo and the residue extracted with 150 mL EtOAc. The organic phase was extracted with 10% NaHCO$_3$ (3×50 mL), the aqueous phase was acidified with conc. HCl until pH=1, and extracted with EtOAc (3×50 mL). The combined organic phase was dried over Na$_2$SO$_4$. Removal of the solvent gave a solid (5.74 g) which was recrystallized from EtOAc to yield the product as colorless crystals. Yield: 3.89 g (43%), mp=187° C.

Preparative Example 7 Disodium bicyclo[2.2.1]hept-5-en-2,3-dicarboxylate

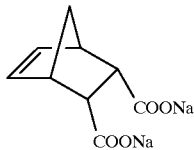

To a suspension of norborn-5-en-2,3-dicarboxylic acid (5.01 g, 27.5 mmole) in H$_2$O (50 mL) was added 1N aq. NaOH (55 mL, 55.0 mmol) at rt and the reaction mixture was stirred until a homogeneous solution was obtained. The solvent was removed in vacuo and the resulting colorless, crystalline product was dried: 5.57 g (90%), mp=385C.

Preparative Example 8 Disodium bicyclo[2.2.1]hept-5-en-2,3-dicarboxylate

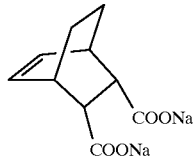

To a suspension of bicyclo[2.2.2]-oct-5-en-2,3-dicarboxylic anhydride (2.01 g, 11.3 mmole) in MeOH (50 mL) was added 1 N aq. NaOH (22.4 mL, 22.4 mmol). The reaction mixture was stirred for 1 hour at room temperature. The solvent was removed in vacuo and the resulting colorless solid was dried: mp>400 C.

In the following Examples and Comparative Examples, various compositions of polyolefins and clarifying and/or nucleating additives were prepared. The compositions were evaluated by measuring crystallization properties using Differential Scanning Calorimetry (DSC) according to ASTM D-794-85, run at a rate of 2° C./min and by measuring haze using ASTM D 1003-92. All percentages given are in wt % unless otherwise stated.

Formulation Example

A composition of the invention was made in a Haake Rheocord 90 melt mixer by combining 0.950 g of the compound of Preparative Example 1 with 190 g of Quantum™ 8310 GO, available from Quantum Chemical Co, Cincinatti, Ohio. The polymer was a random copolymer with 3% ethylene and contained an additive package of 300 ppm Irganox™ 1010 antioxidant, 500 ppm Ultranox™ 626 antioxidant and 1000 ppm calcium stearate.

The composition was mixed for three minutes at 200° C. and 15 rpm and for an additional five minutes at 170° C. at 50 rpm with a one minute transition period between the two sets of conditions.

The crystallization parameters of the composition were determined by DSC. A sample was heated to 200° C., held for 10 minutes, and cooled at a rate of 20° C. per minute to about 40° C. Crystallization temperature at onset and peak temperature were recorded.

To determine clarification ability of the composition, a compression molded haze plaque was prepared by heating 6.5–7 g of the composition to 200° C. for three minutes on a Carver hotpress. The sample was then pressed to (10,000 psi) with a 0.5 mm spacer for four minutes. The plaque was then water cooled to 20–25° C. Percent haze was then measured on a BYK Gardener XL-211 Hazegard System to determine the haze.

Similar compositions were prepared from olefin and the compounds described in Table 1.

Control Example

In the Control Example, a compression molded plaque was made in a manner similar to that described in the Formulation Example except that no nucleating or clarifying additive was used. The % haze of the control material was determined by preparing a plaque using a Cincinnati Milacron 50 ACT-D injection molding machine. The machine operated at 230° C. and the mold was maintained at 32° C. After about 30 seconds, the 1.2 mm thick plaque was ejected from the mold and evaluated as above.

A variety of nucleating/clarifying agents were compounded with polyolefin and evaluated for haze and crystallinity as described in the above Formulation Example. The results are reported in Table 1.

TABLE 1

Cyclopentadiene/Cyclohexadiene Anhydride Derived Additives as Nucleators/Clarifiers

| Entry | Additive | Additive Conc. (% w/w) | Cryst. Temp. (DSC onset) [° C.] | Cryst. Temp. (DSC peak max) [° C.] | % Haze |
|---|---|---|---|---|---|
| A | none | — | 97.1 | 89.8 | 55 |
| B | HOOC-[structure]-O, O | 0.25 | 118.7 | 114.0 | 25 |
| C | [norbornene]-COONa, COONa | 0.5 | 108.3 | 103.0 | 62.6 |
| D | [norbornene]-COOLi, COOLi | 0.5 | 108.1 | 102.0 | 64.5 |
| E | [norbornene]-COONa, COOCH$_3$ | 0.5 | 104.4 | 98.9 | 51.4 |
| F | [norbornene]-COOH, CONH(CH$_2$)$_{17}$C | 0.5 | 107.0 | 103.2 | 53.2 |
| G | [norbornane]-COONa, COONa | 0.5 | 107.5 | 100.1 | 49.9 |
| H | [norbornane]-COOLi, COOLi | 0.5 | 104.9 | 98.6 | 47.0 |
| I | [norbornane]-COONa, COOCH$_3$ | 0.5 | 103.7 | 98.0 | 45.0 |

TABLE 1-continued

Cyclopentadiene/Cyclohexadiene Anhydride Derived Additives as Nucleators/Clarifiers

| Entry | Additive | Additive Conc. (% w/w) | Cryst. Temp. (DSC onset) [° C.] | Cryst. Temp. (DSC peak max) [° C.] | % Haze |
|---|---|---|---|---|---|
| J | 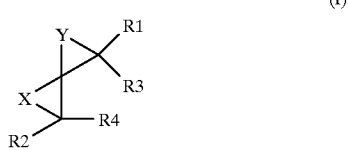 | 0.5 | 100.3 | 93.9 | 50.6 |

For the values given above, an increased crystallization temperature indicates enhanced heterogeneous nucleation of the polymer and decreased haze values demonstrate improved clarity of the polymer.

The foregoing specification and examples provide a complete description of the invention. However, because many variations are possible without departing from the spirit and scope of the invention, the invention resides solely in the claims which follow.

We claim:

1. A composition comprising a polyolefin and, in an amount effective to act as a nucleating or clarifying agent, a modifying agent comprising a compound of formula (I):

(I)

wherein X and Y are independently
  $C_{1-18}$ alkylene,
  $C_{3-18}$ alkenylene,
  $C_{3-18}$ cycloalkylene,
  $C_{4-18}$ cycloalkenylene, or
  arylene;
R1 and R2 are independently
  —H,
  $C_{1-18}$ alkyl, or
  —COR5;
R3 and R4 together form —A—B—C—, wherein
  A and C are independently $$-\overset{O}{\underset{\parallel}{C}}-,$$

—O—,
  —CR6R7—, or
  —CR6—; and
B is a single or double bond, or when neither A nor C is —O—, B is a single bond, a double bond or —O—;
R5 is —OH, —O—$C_{1-18}$ alkyl, —O-aryl, or —NRR';
each R6 and R7 is independently
  —H,
  halogen,
  $C_{1-18}$ alkyl,
  $C_{3-18}$ cycloalkyl,
  —COR5,
  —CRR'—COR5, or
  —NRR';
each R and R' is independently
  —H,
  $C_{1-18}$ alkyl,
  $C_{3-18}$ cycloalkyl, or
  $C_{1-18}$ alkyl substituted by one or more
  —OH, halogen, —COOH, COO$C_{1-18}$ alkyl, $C_{1-18}$ alkylene-S—$C_{1-18}$ alkyl, aryl, or substituted aryl groups;
or a salt thereof.

2. The composition of claim 1, wherein X is $C_{3-18}$ alkenylene and Y is $C_{1-18}$ alkylene.

3. The composition of claim 1, wherein X and Y are both $C_{1-18}$ alkylene.

4. The composition of claim 1, wherein the compound of formula (I) has the following structure:

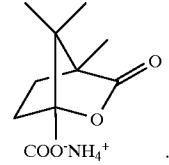

5. The composition of claim 1, wherein the compound of formula (I) has the following structure:

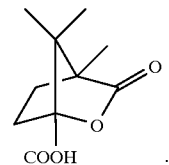

6. The composition of claim 1, wherein the compound of formula (I) is a Na, Li, NH$_4$, or Zn salt.

7. The composition of claim 1, wherein R3 and R4 form A—B—C, A is —CO—, B is a bond, and C is —O—.

8. The composition of claim 1, wherein R3 and R4 are —A—B—C—, A is —CO—, B is —O—, and C is —CO—.

9. The composition of claim 1, wherein the polyolefin comprises polypropylene.

10. The composition of claim 1, wherein the polyolefin comprises a copolymer derived from monomers comprising propylene and ethylene.

11. The composition of claim 1, wherein the modifying agent is present in the composition in an amount in the range from about 0.001 to 1 wt.-%, based on the total composition weight.

12. The composition of claim 1, wherein the modifying agent is present in the composition an amount in the range from about 0.15 to 0.7 wt-%, based on the total composition weight.

13. A composition comprising a polyolefin and, in an amount effective to act as a nucleating or clarifying agent, a modifying agent comprising a compound of formula (II):

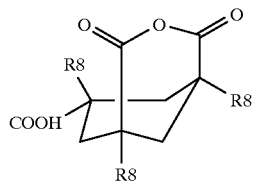

(II)

wherein each R8 is independently a —H or $C_{1-18}$ alkyl group or a salt thereof.

14. A method of enhancing the physical properties of a polyolefin, the method comprising adding, in an amount effective to act as a nucleating or clarifying agent, a modifying agent of formula (I):

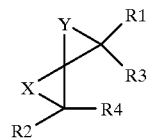

(I)

wherein X and Y are independently
    $C_{3-18}$ alkylene,
    $C_{1-18}$ alkenylene,
    $C_{3-18}$ cycloalkylene,
    $C_{4-18}$ cycloalkenylene, or
    arylene;
R1 and R2 are independently
    —H,
    $C_{1-18}$ alkyl, or
    —COR5;
R3 and R4 together form —A—B—C—, wherein
    A and C are independently

—O—,
    —CR6R7—, or
    —CR6—; and
    B is a single or double bond, or when neither A nor C is —O—, B is a single bond, a double bond or —O—;
R5 is OH, O—$C_{1-18}$ alkyl, —O-aryl, or NRR';
R6 and R7 are independently
    —H,
    halogen,
    $C_{1-18}$ alkyl,
    $C_{3-18}$ cycloalkyl,
    —COR5,
    —CRR'—COR5, or
    —NRR';
each R and R' is independently
    —H,
    $C_{1-18}$ alkyl,
    $C_{3-18}$ cycloalkyl, or
    $C_{1-18}$ alkyl substituted by one or more
    —OH, halogen, —COOH, COO$C_{1-18}$ alkyl, $C_{1-18}$ alkylene-S—$C_{1-18}$ alkyl, aryl, or substituted aryl groups;
or a salt thereof.

15. The method of claim 14, wherein X is $C_{3-18}$ alkenylene and Y is $C_{1-18}$ alkylene.

16. The method of claim 14, wherein X and Y are both $C_{1-18}$ alkylene.

17. The method of claim 14, wherein the compound of formula (I) has the following structure:

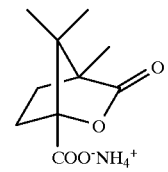

18. The method of claim 14, wherein the compound of formula (I) has the following structure:

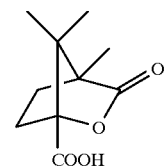

19. The method of claim 14, wherein the compound of formula (I) is a Na, Li, NH$_4$, or Zn salt.

20. The method of claim 14, wherein R3 and R4 form A—B—C, A is —CO—, B is a bond, and C is —O—.

21. The method of claim 14, wherein R3 and R4 are —A—B—C—, A is —CO—, B is —O—, and C is —CO—.

22. The method of claim 14, wherein the polyolefin comprises polypropylene.

23. The method of claim 14, wherein the polyolefin comprises a copolymer derived from monomers comprising propylene and ethylene.

24. The method of claim 14, wherein the modifying agent is added to the polyolefin in an amount in the range from about 0.001 to 1 wt.-% based on the total weight of the polyolefin and the modifying agent.

25. The method of claim 14, wherein the modifying agent is added to the polyolefin in an amount in the range from about 0.15 to 0.7 wt-%, based on the total weight of the polyolefin and the modifying agent.

26. A method of enhancing the physical properties of a polyolefin, the method comprising adding, in an amount effective to act as a nucleating or clarifying agent, a modifying agent of formula (II)

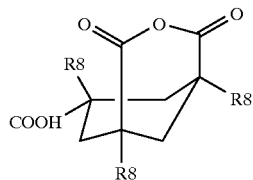

(II)

wherein each R8 is independently a —H or $C_{1-18}$ alkyl group or a salt thereof, to the polyolefin.

27. The composition of claim 1, wherein X and Y are independently
   $C_{1-18}$ alkylene,
   $C_{3-18}$ cycloalkylene,
   $C_{4-18}$ cycloalkenylene, or
   arylene.

28. The method of claim 14, wherein X and Y are independently
   $C_{1-18}$ alkylene,
   $C_{3-18}$ cycloalkylene,
   $C_{4-18}$ cycloalkenylene, or
   arylene.

29. A composition comprising a polyolefin and, in an amount effective to act as a nucleating or clarifying agent, a modifying agent comprising a compound of formula (I):

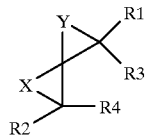

(I)

wherein X and Y are independently
   $C_{1-18}$ alkylene,
   $C_{2-18}$ alkenylene,
   $C_{3-18}$ cycloalkylene,
   $C_{4-18}$ cycloalkenylene, or
   arylene;
R1 and R2 are independently
   —H,
   $C_{1-18}$ alkyl, or
   —COR5;
R3 and R4 together form —A—B—C—, wherein
   A and C are independently
      O
      ‖
      —C—,
      —O—,
      —CR6R7—, or
      —CR6—; and
   B is a single or double bond, or when neither A nor C is —O—, B is a single bond, a double bond, or —O—;
R5 is —OH, —OX wherein X is a cation other than hydrogen, —O—$C_{1-18}$ alkyl, —O-aryl, or —NRR', with the proviso that when X and Y are a $C_2$ alkenylene, and $C_1$ alkylene, and both A and C are —CR6R7, and R6 and R7 of both A and C are —H and C(O)R5, then at least one R5 is other than —OH or —O$C_{1-12}$ alkyl;
each R6 and R7 is independently
   —H,
   halogen,
   $C_{1-18}$ alkyl,
   $C_{3-18}$ cycloalkyl,
   —COR5,
   —CRR'—COR5, or
   —NRR';
each R and R' is independently
   —H,
   $C_{1-18}$ alkyl,
   $C_{3-18}$ cycloalkyl, or
   $C_{1-18}$ alkyl substituted by one or more —OH, halogen, —COOH, COO$C_{1-18}$ alkyl, $C_{1-18}$ alkylene-S—$C_{1-18}$ alkyl, aryl, or substituted aryl groups.

30. A method of enhancing the physical properties of a polyolefin, the method comprising adding, in an amount effective to act as a nucleating or clarifying agent, a compound of formula (I):

(I)

wherein X and Y are independently
   $C_{1-18}$ alkylene,
   $C_{2-18}$ alkenylene,
   $C_{3-18}$ cycloalkylene,
   $C_{4-18}$ cycloalkenylene, or
   arylene;
R1 and R2 are independently
   —H,
   $C_{1-18}$ alkyl, or
   —COR5;
R3 and R4 together form —A—B—C—, wherein
   A and C are independently

O
      ‖
      —C—,

—O—,
      —CR6R7—, or
      —CR6—; and
   B is a single or double bond, or when neither A nor C is —O—, B is a single bond, a double bond, or —O—;
R5 is —OH, —OX wherein X is a cation other than hydrogen, O—$C_{1-18}$ alkyl, —O-aryl, or NRR', with the proviso that when X and Y are a $C_2$ alkenylene and $C_1$ alkylene, and both A and C are —CR6R7—, and R6 and R7 of both A and C are —H and C(O)R5, then at least one R5 is other than —OH or —O$C_{1-12}$ alkl;
R6 and R7 are independently
   —H,
   halogen,
   $C_{1-18}$ alkyl,
   $C_{3-18}$ cycloalkyl,
   —COR5, —CRR'—COR5, or

—NRR';

each R and R' is independently

—H,

C$_{1-18}$ alkyl,

C$_{3-18}$ cycloalkyl, or

C$_{1-18}$ alkyl substituted by one or more

—OH, halogen, —COOH, COOC$_{1-18}$ alkyl, C$_{1-18}$ alkylene-S—C$_{1-18}$ alkyl, aryl, or substituted aryl groups.

31. The composition of claim 29 wherein X is C$_{2-18}$ alkenylene and Y is C$_{1-18}$ alkylene.

32. The composition of claim 31 wherein R3 and R4 together form

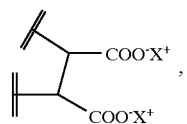

wherein X is a metal cation.

33. The composition of claim 31, wherein the compound of formula (I) has the following structure:

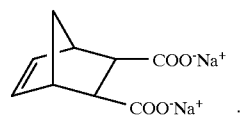

34. The method of claim 32 wherein X is C$_{2-18}$ alkenylene and Y is C$_{1-18}$ alkylene.

35. The method of claim 32 wherein R3 and R4 together form

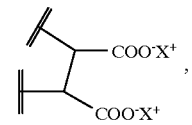

wherein X is a metal cation.

36. The method of claim 32, wherein the compound of formula (I) has the following structure:

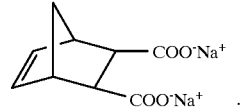

* * * * *